No. 806,201. PATENTED DEC. 5, 1905.
H. C. SISCO.
SEAL FOR PIPE UNIONS.
APPLICATION FILED JULY 31, 1905.
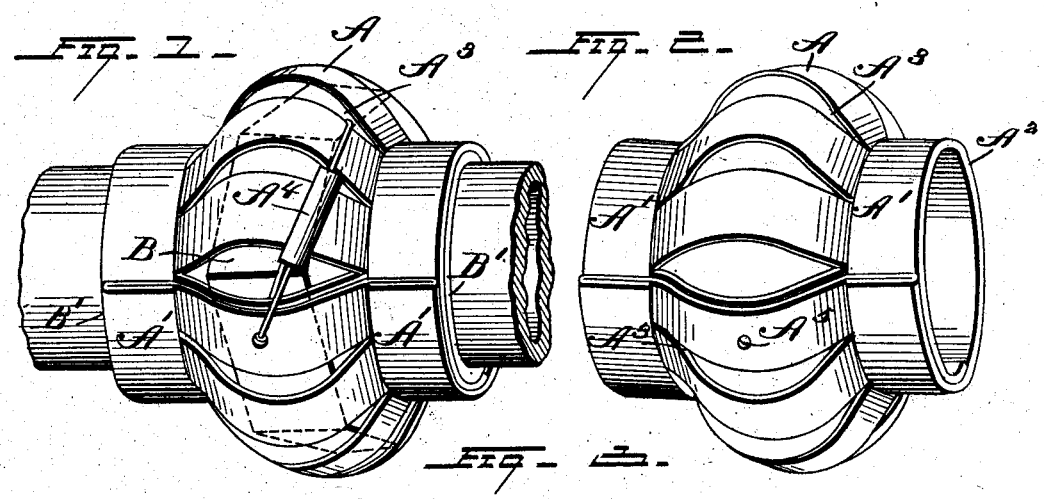
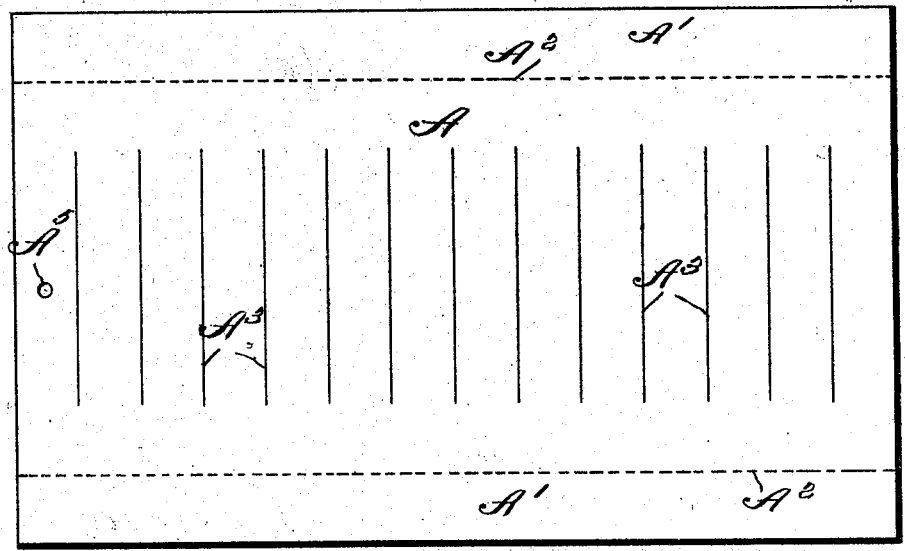
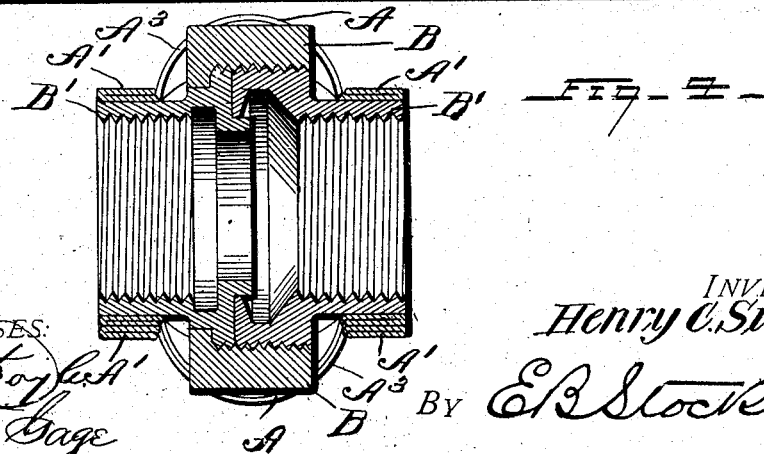
WITNESSES:
INVENTOR
Henry C. Sisco.
BY E. B. Stocking
Attorney

UNITED STATES PATENT OFFICE.

HENRY C. SISCO, OF ANDERSON, INDIANA, ASSIGNOR OF ONE-HALF TO H. L. MILLSPAUGH, OF ANDERSON, INDIANA.

SEAL FOR PIPE-UNIONS.

No. 806,201.  Specification of Letters Patent.  Patented Dec. 5, 1905.

Application filed July 31, 1905. Serial No. 272,059.

*To all whom it may concern:*

Be it known that I, HENRY C. SISCO, a citizen of the United States, residing at Anderson, in the county of Madison, State of Indiana, have invented certain new and useful Improvements in Seals for Pipe-Unions, of which the following is a specification, reference being had therein to the accompanying drawings.

This invention relates to a seal for pipe-unions, and particularly to a device of that character formed from a single blank or piece of material.

The invention has for an object to provide a seal having bands at its opposite ends to encircle and protect the ends of the pipe joint or union and with an intermediate slitted portion expanded laterally to form a cylindrical body inclosing the union.

Other and further objects of the invention will be hereinafter set forth and the novel features thereof defined in the appended claims.

In the drawings, Figure 1 is a perspective view of the seal applied to a pipe-union. Fig. 2 is a similar view of the same removed from the pipe. Fig. 3 is a plan of the blank from which the seal is formed, and Fig. 4 is a longitudinal section through the seal applied to the pipe.

Like letters of reference refer to like parts throughout the several figures of the drawings.

The seal is preferably formed of a single blank or piece of flexible metal of any desired character. For instance, as shown in Fig. 3, the body portion A has its opposite side portions A' bent upon themselves on the dotted lines $A^2$ to form a reinforcing-band at each end of the seal, which band closely encircles and reinforces the ends of the seal when the parts are drawn tightly in position. The body A of the band is provided throughout its length with a series of parallel slits or cuts extending transversely thereof, and the blank is then compressed in a transverse direction to expand the central slitted portion thereof outward into the position shown in Fig. 2 to form a cylindrical portion in which the nut B of the union may be inclosed. It is also desirable to tightly apply the union, so that the angle faces of its nut may project through the expanded slits $A^3$ of the seal, and thus be held against any possible slipping or rotative movement after the parts are applied. The bent portions A' at the opposite ends of the union closely surround the pipe-receiving members B' thereof, thereby completely covering and sealing the ends of the pipe-union. When the seal is applied in position, it may be held tightly surrounding the union in any desired manner—for instance, by the usual seal $A^4$ applied thereto by means of wire extending from an aperture $C^5$ in one end of the seal and between the expanded members thereof.

When the seal is applied in position, as before described, it will be seen that unauthorized access to the pipe-union is prevented, as well as accidental movement or rotation of the nut B thereof, since the central expanded portion completely surrounds and holds this nut, while the band tightly encircles the ends of the union in order to seal the same. The seal is also adjustable for different sizes of unions, as it may be expanded circumferentially and tightly fitted thereto. It will also be observed that the seal does not bend or open at any single point, but the opening-and-closing movement thereof is even, owing to the flexible character of the material, which renders it capable of continued use without danger of breakage or other injury.

Having now described my invention and set forth its merits, what I claim, and desire to secure by Letters Patent, is—

1. A seal for a pipe-union comprising band portions at its opposite ends and an intermediate slitted portion expanded laterally of the body.

2. A seal for a pipe-union comprising a single piece of flexible material having its longitudinal edges bent upon themselves to form band portions and provided intermediate of said edges with a series of parallel transversely-extending slits adapted to be expanded laterally when the blank is bent into cylindrical form.

3. In a seal for a pipe-union, the combination with a union, of a seal formed of flexible material having at its opposite ends bent portions to closely encircle the ends of said union, and provided intermediate of its ends with a slitted portion laterally expanded to surround the nut of the union and receive an angle-face thereof within said slitted portion.

In testimony whereof I affix my signature in presence of two witnesses.

HENRY C. SISCO.

Witnesses:
PATRICK J. CASEY,
WILLIAM H. KITTINGER.